United States Patent
Hyodo et al.

(10) Patent No.: US 11,891,781 B2
(45) Date of Patent: Feb. 6, 2024

(54) LOADING VEHICLE

(71) Applicant: HITACHI CONSTRUCTION MACHINERY CO., LTD., Tokyo (JP)

(72) Inventors: Koji Hyodo, Kasumigaura (JP); Fumihiro Nakao, Abiko (JP); Yasunori Miyamoto, Ushiku (JP); Masaki Nukii, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 653 days.

(21) Appl. No.: 17/251,069

(22) PCT Filed: Mar. 13, 2019

(86) PCT No.: PCT/JP2019/010340
§ 371 (c)(1),
(2) Date: Dec. 10, 2020

(87) PCT Pub. No.: WO2020/183665
PCT Pub. Date: Sep. 17, 2020

(65) Prior Publication Data
US 2021/0123216 A1     Apr. 29, 2021

(51) Int. Cl.
*E02F 9/22*     (2006.01)
*E02F 3/28*     (2006.01)
(Continued)

(52) U.S. Cl.
CPC ............ *E02F 9/2253* (2013.01); *E02F 3/283* (2013.01); *E02F 9/02* (2013.01); *E02F 9/2228* (2013.01);
(Continued)

(58) Field of Classification Search
CPC ......... E02F 9/2253; E02F 9/02; E02F 9/2228; E02F 9/2292; E02F 9/2296; E02F 3/283; F15B 15/00
See application file for complete search history.

(56) References Cited

U.S. PATENT DOCUMENTS

| 5,174,114 A * | 12/1992 | Aoyagi | E02F 9/2296 60/431 |
| 2009/0126361 A1 * | 5/2009 | Kakizawa | E02F 9/2296 60/445 |

(Continued)

FOREIGN PATENT DOCUMENTS

| CN | 101631973 A | 1/2010 |
| EP | 2466017 A1 | 6/2012 |

(Continued)

OTHER PUBLICATIONS

International Search Report of PCT/JP2019/010340 dated Jun. 4, 2020.

*Primary Examiner* — Gerald McClain
(74) *Attorney, Agent, or Firm* — Mattingly & Malur, PC

(57) ABSTRACT

A loading vehicle is capable of improving work efficiency by adjusting engine rotational speed with high accuracy in accordance with an operation state of the working device. An HST traveling driven wheel loader has an electrically controlled HST pump. A controller is configured to control input torque of the HST pump 31 and solenoid proportional pressure reducing valve is configured to generate control pressure for controlling displacement volume of the pump based on a control signal from the controller. The controller is configured to calculate the displacement volume q of the HST pump based on discharge pressure Pf of a loading hydraulic pump so that maximum input torque Thst of the HST pump decreases as the discharge pressure Pf or input torque of the loading hydraulic pump increases, and output a control signal corresponding to the calculated displacement volume q to the solenoid proportional pressure reducing valve.

4 Claims, 10 Drawing Sheets

(51) Int. Cl.
*E02F 9/02* (2006.01)
*F15B 15/00* (2006.01)
(52) U.S. Cl.
CPC .......... *E02F 9/2292* (2013.01); *E02F 9/2296* (2013.01); *F15B 15/00* (2013.01); *E02F 9/2285* (2013.01)

(56) References Cited

U.S. PATENT DOCUMENTS

| | | | | |
|---|---|---|---|---|
| 2012/0285157 A1* | 11/2012 | Okano | ................... | E02F 9/2285 60/445 |
| 2021/0262202 A1* | 8/2021 | Hyodo | ................ | F16H 61/4017 |
| 2022/0298755 A1* | 9/2022 | Udagawa | .............. | F15B 19/005 |

FOREIGN PATENT DOCUMENTS

| | | | | |
|---|---|---|---|---|
| EP | 2568148 A1 * | 3/2013 | ............ | E02F 9/0841 |
| EP | 2568148 A1 | 3/2013 | | |
| EP | 2589836 A1 * | 5/2013 | ............. | E02F 3/283 |
| EP | 2589836 A1 | 8/2013 | | |
| JP | 2010-025179 A | 2/2010 | | |
| JP | 2010-223416 A | 10/2010 | | |
| JP | 6163082 B2 | 7/2017 | | |
| WO | 2009/019974 A1 | 2/2009 | | |
| WO | 2015/068545 A1 | 5/2015 | | |

\* cited by examiner

LOADING VEHICLE

TECHNICAL FIELD

The present invention relates to a loading vehicle on which an HST traveling drive system is mounted.

BACKGROUND ART

As represented by a wheel loader, in a loading vehicle having a hydraulic circuit for traveling and a hydraulic circuit for a working device which performs loading work, since an HST pump serving as a traveling hydraulic pump and a loading hydraulic pump are driven by the same engine, the sum of an input torque of the HST pump and an input torque of the loading hydraulic pump becomes an output torque of the engine. Accordingly, in order not to reduce work efficiency, it is important to adjust the input torque of the HST pump and the input torque of the loading hydraulic pump.

For example, Patent Literature 1 discloses a wheel loader in which either of a power mode corresponding to heavy excavation and an eco mode for reducing fuel consumption by suppressing engine rotational speed less than that in the power mode can be selected as a work mode. In the wheel loader of Patent Literature 1, when a lifting operation of a lift arm is detected while the eco mode is selected as the work mode, an input torque of the HST pump is controlled to a characteristic at the lifting operation which is smaller than a characteristic at the eco mode so as to increase matching rotational speed of the engine. With this configuration, a discharge flow rate of the loading hydraulic pump is increased to suppress decrease in lifting operation speed of the lift arm, thereby improving work efficiency.

CITATION LIST

Patent Literature

Patent Literature 1: JP 6163082 B

SUMMARY OF INVENTION

Technical Problem

However, the wheel loader disclosed in Patent Literature 1 is merely configured that, regardless of magnitude of the input torque of the loading hydraulic pump, when a lifting operation of the lift arm is detected, matching rotational speed of the engine is controlled to predetermined rotational speed which is between the matching rotational speed of the engine in the eco mode and the matching rotational speed of the engine in the power mode. Accordingly, in the wheel loader disclosed in Patent Literature 1, adjustment of the engine rotational speed cannot be performed finely in accordance with an operation state of the working device. As a result, in some cases, vehicle speed becomes slower than necessary with respect to the operation state of the working device, and thus there is room to improve the work efficiency.

An object of the present invention is to provide a loading vehicle capable of improving work efficiency by adjusting engine rotational speed with high accuracy in accordance with an operation state of the working device.

Solution to Problem

In order to achieve the object above, the present invention provides a loading vehicle comprising: a vehicle body including a plurality of wheels; an engine mounted on the vehicle body; a variable displacement traveling hydraulic pump that is driven by the engine; a traveling hydraulic motor that is connected to the traveling hydraulic pump through a closed circuit and transmits drive force of the engine to the plurality of wheels; a working device that is mounted rotatably in a vertical direction with respect to the vehicle body; a loading hydraulic pump that is driven by the engine and supplies hydraulic oil to the working device; and a discharge pressure sensor that detects discharge pressure of the loading hydraulic pump, wherein the loading vehicle further comprises: a controller configured to control input torque of the traveling hydraulic pump; and a solenoid proportional valve configured to generate control pressure for controlling displacement volume of the traveling hydraulic pump based on a control signal output from the controller, and wherein the controller is configured to: calculate the displacement volume of the traveling hydraulic pump based on the discharge pressure detected by the discharge pressure sensor so that maximum input torque of the traveling hydraulic pump decreases as the discharge pressure of the loading hydraulic pump or the input torque of the loading hydraulic pump increases; and output a control signal corresponding to the calculated displacement volume to the solenoid proportional valve.

Advantageous Effects of Invention

According to the present invention, it is possible to improve work efficiency by adjusting engine rotational speed with high accuracy in accordance with an operation state of the working device. The problems, configurations, and effects other than those described above will be clarified by explanation of the embodiments below.

BRIEF DESCRIPTION OF DRAWINGS

FIG. 8 illustrates a graph showing relationship between discharge pressure of a loading hydraulic pump or input torque of the loading hydraulic pump and maximum input torque of an HST pump. In particular.

DESCRIPTION OF EMBODIMENTS

Hereinafter, as an aspect of the loading vehicle according to an embodiment of the present invention, a wheel loader configured to perform loading work by excavating such as earth and sand and minerals in a strip mine and loading them into a dump truck, etc. will be described.
(Overall Configuration of Wheel Loader 1)

First, an overall configuration of a wheel loader 1 according to an embodiment of the present invention will be described with reference to FIG. 1.

Figure 1:
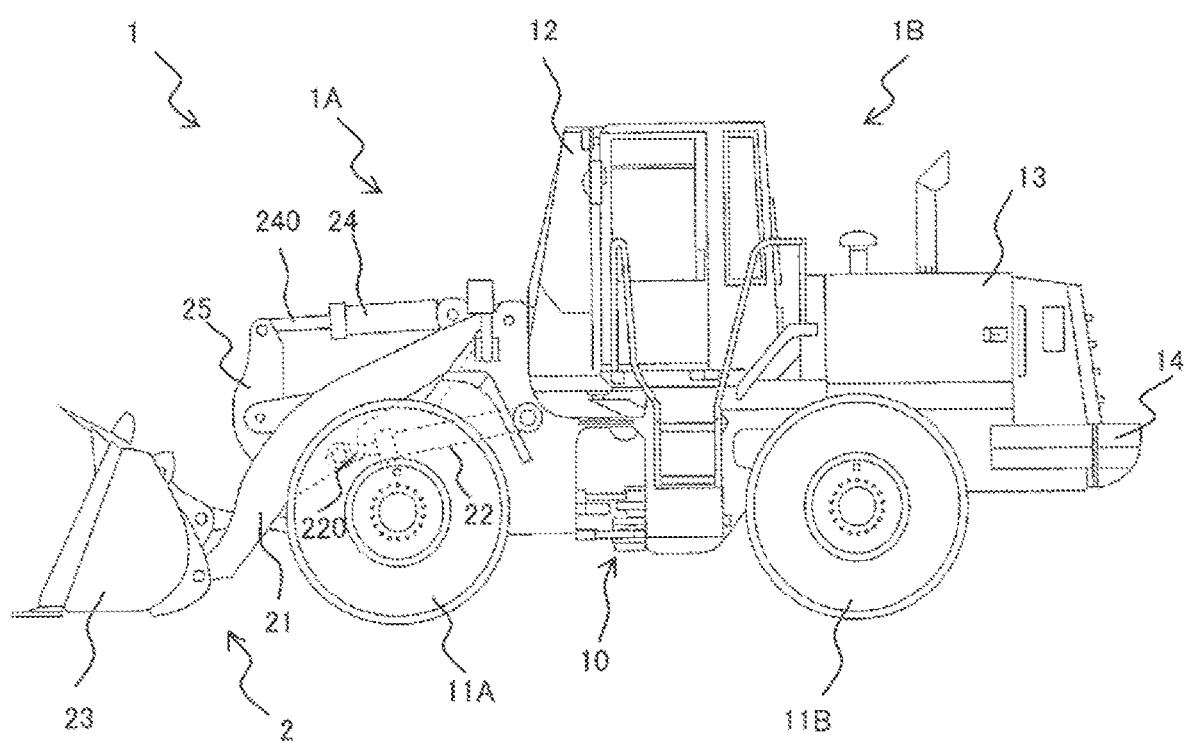
FIG. 1 is a side view illustrating appearance of a wheel loader according to an embodiment of the present invention.

FIG. 1 is a side view illustrating appearance of the wheel loader 1 according to the embodiment of the present invention.

The wheel loader 1 is an articulated type work vehicle which is swiveled on a central portion of a vehicle body including a front frame 1A and a rear frame 1B and steered thereby. In particular, the front frame 1A and the rear frame 1B are connected to each other by a center joint 10 to swivel in the left and right direction so that the front frame 1A is bent in the left and right directions with respect to the rear frame 1B.

The front frame 1A is provided with a pair of left and right front wheels 11A and a working device 2 for performing loading work. The rear frame 1B is provided with a pair of left and right rear wheels 11B, an operator's cab 12 to be boarded by an operator, a mechanical room 13 in which devices such as an engine, a controller, hydraulic pumps, etc. are accommodated, and a counterweight 14 for maintaining balance between the vehicle body and the working device 2 to prevent the vehicle body from tilting. In the rear frame 1B, the operator's cab 12 is disposed on the front, the counterweight 14 is disposed on the rear, and the mechanical room 13 is disposed between the operator's cab and the counterweight 14, respectively.

The working device 2 includes a lift arm 21 attached to the front frame 1A, a pair of lift arm cylinders 22 configured to expand and contract to rotate the lift arm 21 in the vertical direction with respect to the front frame 1A, a bucket 23 attached to the front end portion of the lift arm 21, a bucket cylinder 24 configured to expand and contract to rotate the bucket 23 in the vertical direction with respect to the lift arm 21, a bell crank 25 that is rotatably connected to the lift arm 21 and constitutes a link mechanism between the bucket 23 and the bucket cylinder 24, and a plurality of pipelines (not illustrated) for leading pressure oil to the pair of lift arm cylinders 22 and the bucket cylinder 24. FIG. 1 illustrates only one of the pair of lift arm cylinders 22, which is disposed on the left side, by indicating it with a broken line.

The lift arm 21 is rotated in the upward direction by expansion of a rod 220 of each of the lift arm cylinders 22, and rotated in the downward direction by contraction of each rod 220. The bucket 23 is tilted (rotated in the upward direction with respect to the lift arm 21) by expansion of a rod 240 of the bucket cylinder 24, and dumped (rotated in the downward direction with respect to the lift arm 21) by contraction of the rod 240.

In the wheel loader 1, the bucket 23 can be replaced with various attachments such as a blade, and in addition to general loading work such as excavation and loading, various work such as dozing work and snow removing work can be performed. In particular, during the excavation work or the loading work, both traction force of the vehicle body (traveling drive force) and drive force of the working device 2 are required, however, for example, when the traction force of the vehicle body is too greater than the drive force of the working device 2, operation speed of the working device 2 becomes slow and the work efficiency may be decreased. Accordingly, in order not to reduce the work efficiency, it is necessary to adjust balance between the traction force of the vehicle body and the drive force of the working device 2.
(Drive System of Wheel Loader 1)

Next, a drive system of the wheel loader 1 will be described with reference to FIGS. 2 to 6.

Figure 2:
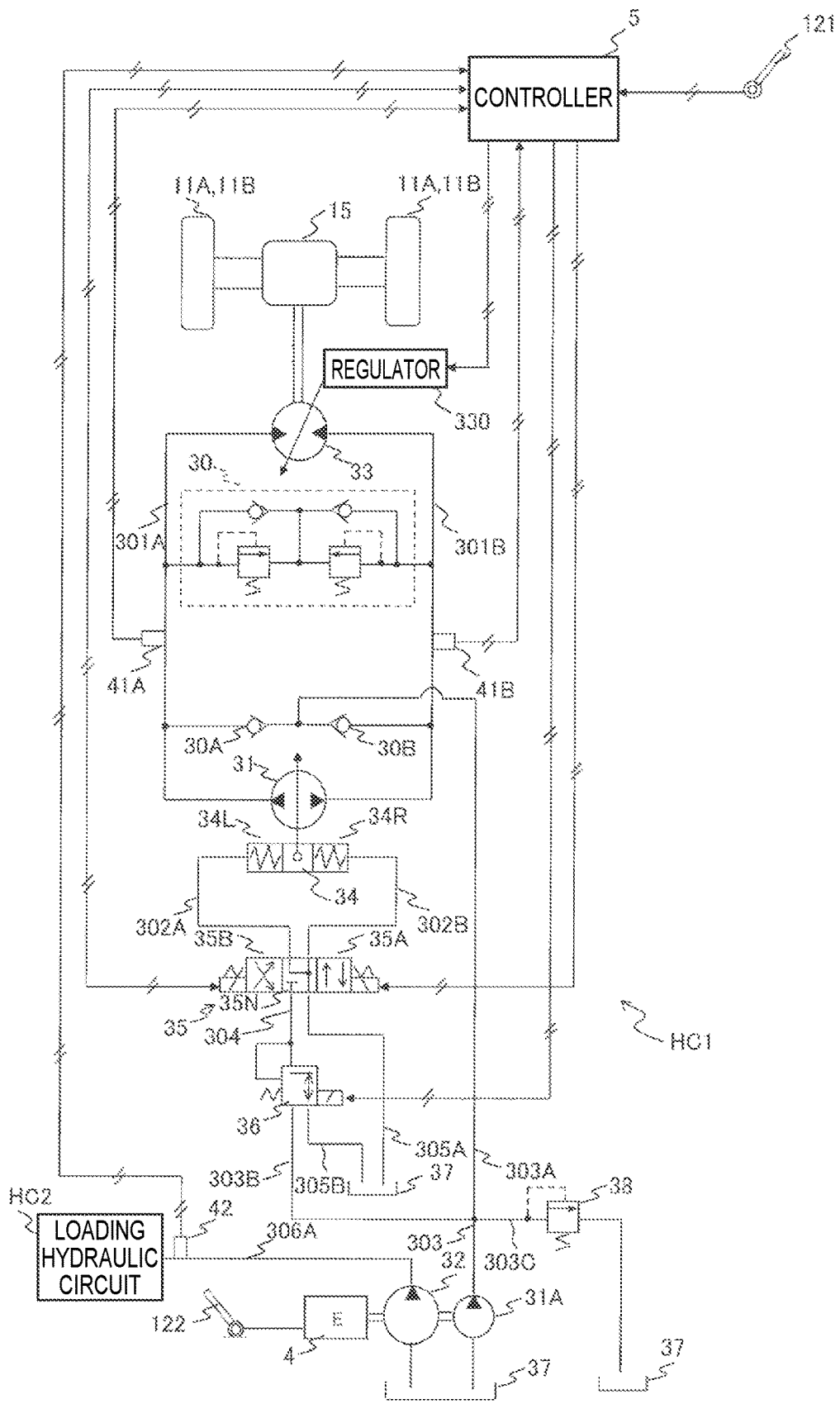
FIG. 2 illustrates a hydraulic circuit and an electric circuit according to drive of a wheel loader.
Figure 3A:
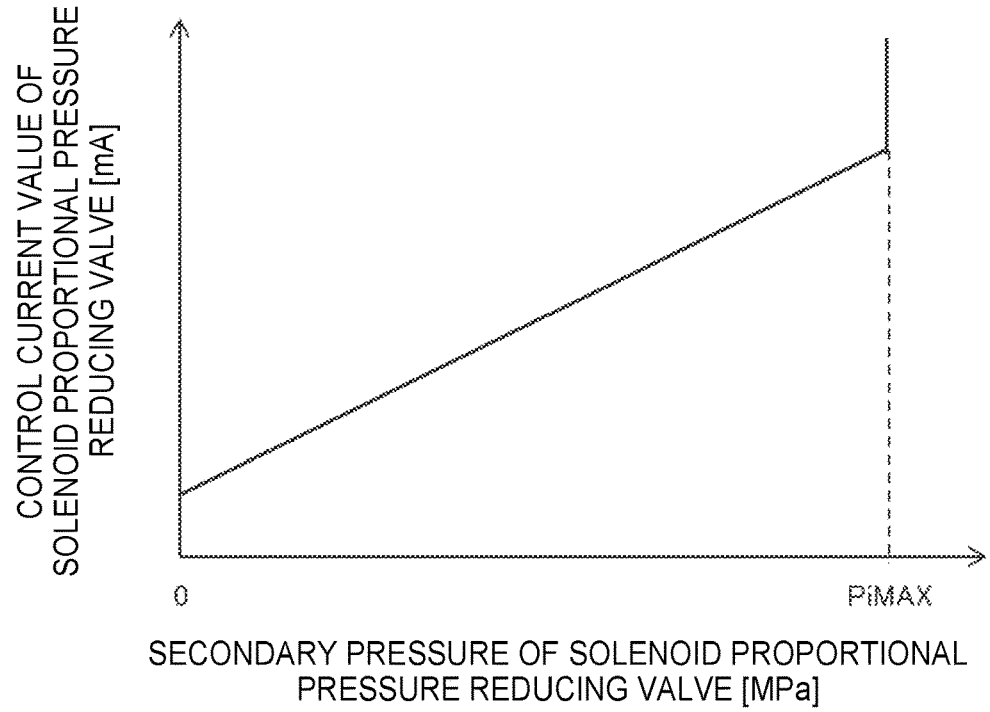
FIG. 3(a) illustrates a graph showing relationship between secondary pressure of a solenoid proportional pressure reducing valve and a control current value of the solenoid proportional pressure reducing valve.
Figure 3B:
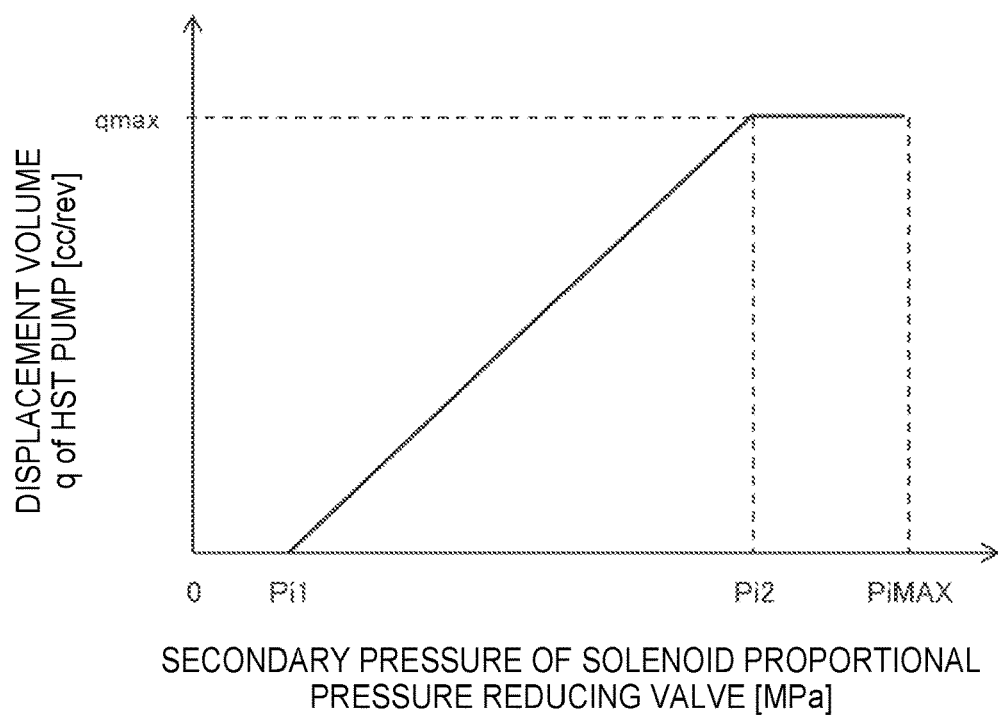
FIG. 3(b) illustrates a graph showing relationship between secondary pressure of a solenoid proportional pressure reducing valve and displacement volume of an HST pump.
Figure 4:
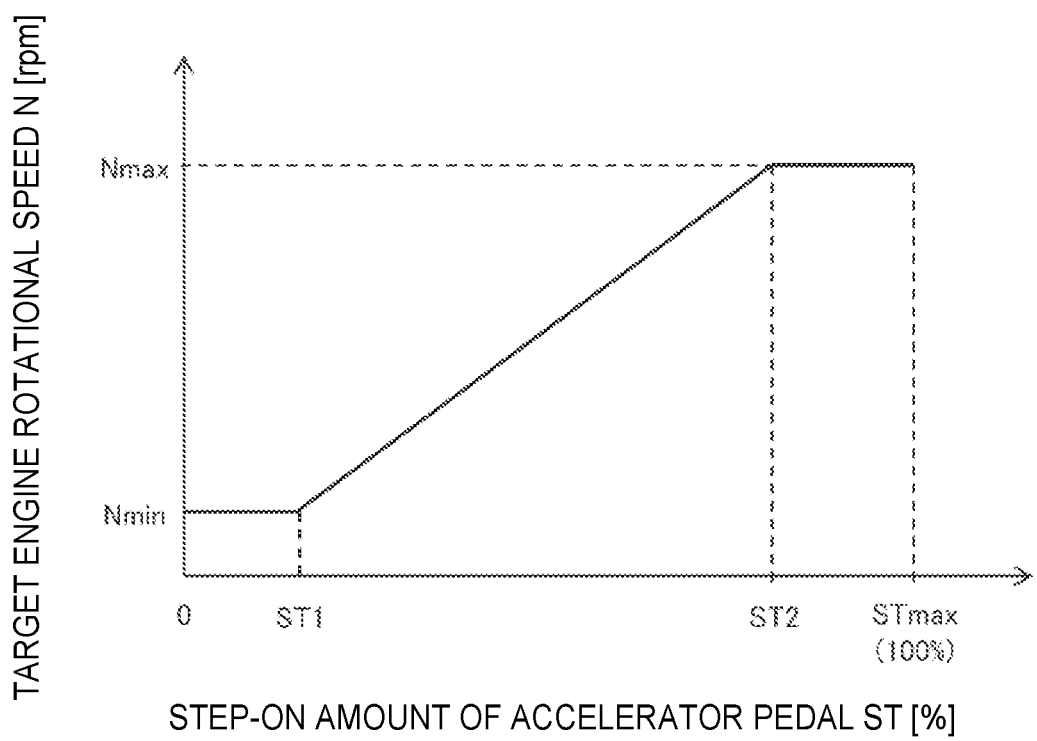
FIG. 4 illustrates a graph showing relationship between a step-on amount of an accelerator pedal and target engine rotational speed.
Figure 5A:
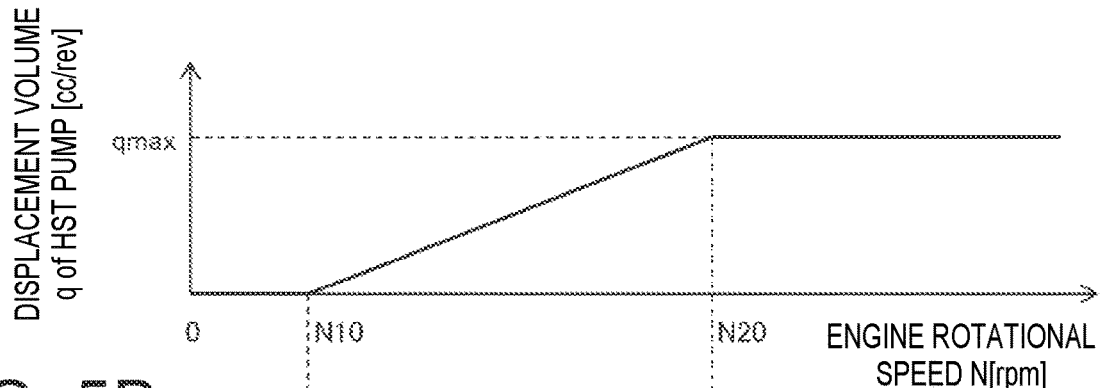
FIG. 5(a) illustrates a graph showing relationship between engine rotational speed and displacement volume of an HST pump.
Figure 5B:
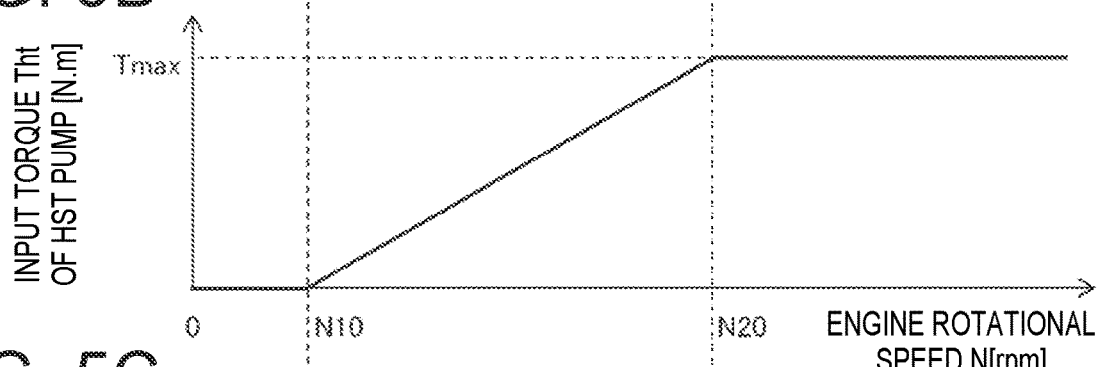
FIG. 5(b) illustrates a graph showing relationship between engine rotational speed and input torque of an HST pump.
Figure 5C:
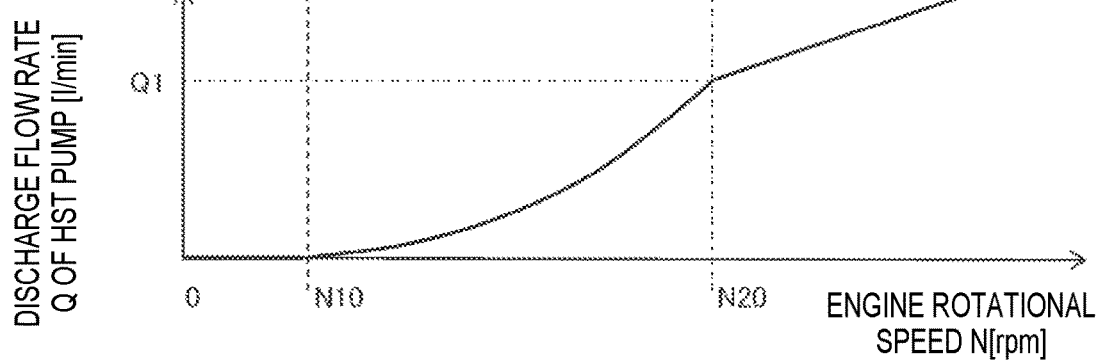
FIG. 5(c) illustrates a graph showing relationship between engine rotational speed and a discharge flow rate of an HST pump.

FIG. 2 illustrates a hydraulic circuit HC1 and an electric circuit according to drive of the wheel loader 1. FIG. 3(a) illustrates a graph showing relationship between secondary pressure of a solenoid proportional pressure reducing valve 36 and a control current value of the solenoid proportional pressure reducing valve 36, and FIG. 3(b) illustrates a graph showing relationship between the secondary pressure of the solenoid proportional pressure reducing valve 36 and displacement volume q of an HST pump 31. FIG. 4 illustrates a graph showing relationship between a step-on amount ST of an accelerator pedal 122 and target engine rotational speed N. FIG. 5(a) illustrates a graph showing relationship between rotational speed N of an engine 4 and the displacement volume q of the HST pump 31, FIG. 5(b) illustrates a graph showing relationship between the rotational speed of the engine 4 and input torque Thst of the HST pump 31, and FIG. 5(c) illustrates a graph showing relationship between the rotational speed N of the engine 4 and a discharge flow rate Q of the HST pump 31.

The wheel loader 1 includes a traveling hydraulic circuit HC1 which is a hydraulic circuit for driving the vehicle body to travel, and a loading hydraulic circuit HC2 which is a hydraulic circuit for driving the working device 2. The HST pump 31 serving as a traveling hydraulic pump, an HST charge pump 31A for providing hydraulic oil for controlling the HST pump 31, and the loading hydraulic pump 32 for supplying the working device 2 with the hydraulic oil are commonly driven by one engine 4.

The wheel loader 1 employs an HST traveling drive system. The traveling hydraulic circuit HC1 includes the HST pump 31, the HST charge pump 31A, and an HST motor 33 serving as a traveling hydraulic motor.

Both the HST pump 31 and the HST motor 33 are electrically controlled hydraulic pumps which are controlled by the controller 5, and are connected through a closed circuit via a pair of connection pipelines 301A, 301B. A relief valve unit 30 is provided on a pipeline which connects one connection pipeline 301A and the other connection pipe 301B so as to limit maximum pressure in the pair of connection pipelines 301A, 301B.

The HST pump 31 is a swash plate type or a swash shaft type variable displacement hydraulic pump in which displacement volume is controlled in accordance with a tilt amount (tilt angle). The tilt amount is adjusted by a tilt cylinder 34 having left and right oil chambers 34L, 34R. The tilt cylinder 34 is driven by hydraulic oil discharged from the HST charge pump 31A which acts as pilot pressure on each of the left and right oil chambers 34L, 34R.

A traveling side discharge pipeline 303 is connected at a discharge side of the HST charge pump 31A. The traveling side discharge pipeline 303 branches into three main pipelines, i.e., a first main pipeline 303A, a second main pipeline 303B, and a third main pipeline 303C. A part of the hydraulic oil discharged from the HST charge pump 31A passes through the first main pipeline 303A, and then is led to each of the pair of connection pipes 301A, 301B via check valves 30A, 30B.

Between the HST charge pump 31A and the tilt cylinder 34, a forward/reverse switch valve 35 configured to switch forward/reverse movement of the vehicle body, and a solenoid proportional pressure reducing valve 36 as a solenoid proportional valve configured to generate control pressure for controlling displacement volume of the HST pump 31, are provided.

The forward/reverse movement switch valve 35 is connected to the left and right oil chambers 34L, 34R of the tilt cylinder 34 via a pair of pilot pipelines 302A, 302B. The forward/reverse movement switch valve 35 includes a forward position 35A which is a position for moving the vehicle body in a forward direction, a reverse position 35B which is a position for moving the vehicle body in a reverse direction, and a neutral position 35N which is a position for stopping the vehicle body. The forward/reverse movement switch valve 35 is a solenoid switch valve, which is configured to respectively switch the forward position 35A, the reverse position 35B, and the neutral position 35N based on an operation signal output from an electric forward/reverse movement switch lever 121 provided in the operator's cab 12 to the forward/reverse movement switch valve 35 via the controller 5.

The solenoid proportional pressure reducing valve 36 is disposed on the upstream side of the forward/reverse switch valve 35, and connected to the traveling side discharge pipeline 303 via the second main pipeline 303B. A charge relief valve 38 is provided in the third main pipeline 303C connected to a hydraulic oil tank 37, and thus primary pressure of the solenoid proportional pressure reducing valve 36 corresponds to HST charge relief pressure. Then, the solenoid proportional pressure reducing valve 36 decompresses the primary pressure based on a control signal output from the controller 5, and generates secondary pressure as control pressure for controlling the displacement volume of the HST pump 31.

Specifically, as illustrated in FIG. 3(a), the secondary pressure generated by the solenoid proportional pressure reducing valve 36 is proportional to a control current value (control signal) output from the controller 5 to the solenoid proportional pressure reducing valve 36. As the control current value increases, the generated secondary pressure also increases from 0 to PiMAX.

After being led to the forward/reverse movement switch valve 35 via a pipeline 304, the secondary pressure generated by the solenoid proportional pressure reducing valve 36 acts on, as tilt control pressure, either of the left and right oil chambers 34L, 34R of the tilt cylinder 34, thereby controlling the displacement volume of the HST pump 31. Specifically, as illustrated in FIG. 3(b), the secondary pressure generated by the solenoid proportional pressure reducing valve 36 is proportional to the displacement volume q of the HST pump, and accordingly, as the secondary pressure increases from Pi1, the displacement volume q also increases. When the secondary pressure becomes Pi1, the displacement volume q reaches the maximum value qmax and then becomes constant until the secondary pressure reaches PiMAX.

As illustrated in FIG. 2, both the forward/reverse movement switch valve 35 and the solenoid proportional pressure reducing valve 36 are connected to the hydraulic oil tank 37 via the discharge pipelines 305A, 305B.

The HST motor 33 is a swash plate type or a swash shaft type variable displacement hydraulic motor in which the displacement volume is controlled in accordance with a tilt amount (tilt angle). The tilt amount is adjusted by a regulator 330 which is controlled based on a command signal output from the controller 5.

As illustrated in FIG. 2, when the forward/reverse movement switch valve 35 is in the neutral position 35N, the pilot pipeline 302A and the pilot pipeline 302B are connected to each other, and thus the left and right oil chambers 34L, 34R of the tilt cylinder 34 communicate with the hydraulic oil tank 37 via the discharge pipeline 305A. Accordingly, the pressure acting on the left and right oil chambers 34L, 34R of the tilt cylinder 34 becomes the same.

As a result, since a piston of the tilt cylinder 34 is in a neutral position and the displacement volume of the HST pump 31 becomes zero, the discharge flow rate becomes zero and thus the wheel loader 1 is stopped.

On the other hand, when the operator operates the forward/reverse movement switch lever 121 in the forward direction to switch the forward/reverse movement switch valve 35 to the forward position 35A, the secondary pressure of the solenoid proportional pressure reducing valve 36 is led to the pilot pipeline 302A which is one of the pair of pilot pipelines, and acts on the left oil chamber 34L of the tilt cylinder 34. At this time, the pressure does not act on the right oil chamber 34R of the tilt cylinder 34 since it communicates with the hydraulic oil tank 37 via the pilot pipeline 302B which is the other one of the pair of pilot pipelines and the discharge pipeline 305A.

Accordingly, the piston of the tilt cylinder 34 is displaced to the right direction in FIG. 2 by an amount of the secondary pressure generated by the solenoid proportional pressure reducing valve 36, whereby the displacement volume of the HST pump 31 is set. Since the HST pump 31 discharges the hydraulic oil at a flow rate corresponding to the set displacement volume to a side of the connection pipeline 301A which is one of the pair of connection pipelines, the HST motor 33 is rotated in a normal direction, thereby moving the wheel loader 1 in the forward direction.

The connection pipeline 301A is provided with a forward side pressure sensor 41A configured to detect discharge pressure of the HST pump 31 on the forward side. A pressure value detected by the forward side pressure sensor 41A is input to the controller 5.

When the operator operates the forward/reverse movement switch lever 121 in the reverse direction to switch the forward/reverse movement switch valve 35 to the reverse position 35B, the secondary pressure of the solenoid proportional pressure reducing valve 36 is led to the pilot line 302B, and acts on the right oil chamber 34R of the tilt cylinder 34. At this time, the pressure does not act on the left oil chamber 34L of the tilt cylinder 34 since it communicates with the hydraulic oil tank 37 via the pilot pipeline 302A and the discharge pipeline 305.

Accordingly, the piston of the tilt cylinder 34 is displaced to the left direction in FIG. 2 by an amount of the secondary pressure generated by the solenoid proportional pressure reducing valve 36, whereby the displacement volume of the HST pump 31 is set. Since the HST pump 31 discharges the hydraulic oil at a flow rate corresponding to the set displacement volume to a side of the connection pipeline 301B which is the other one of the pair of connection pipelines, the HST motor 33 is rotated in an opposite direction, thereby moving the wheel loader 1 in the reverse direction.

The connection pipeline 301B is provided with a forward side pressure sensor 41B configured to detect discharge pressure of the HST pump 31 on the forward side. A pressure value detected by the forward side pressure sensor 41B is input to the controller 5.

As described above, the HST motor 33 is rotated by the hydraulic oil led from the HST pump 31. Then, output torque from the HST motor 33 is transmitted to the front wheels 11A and the rear wheels 11B via an axle 15, whereby the wheel loader 1 travels. Accordingly, the output torque of the HST motor 33 corresponds to traveling drive force of the wheel loader 1, in other words, traction force of the vehicle body, which is expressed by the product of the displacement volume of the HST motor 33 and traveling load pressure P.

Here, the "traveling load pressure P" is differential pressure between a pressure value PA detected by the forward side pressure sensor 41A and a pressure value PB detected by the forward side pressure sensor 41B (P=|PA−PB|). However, when the vehicle body moves in the forward direction, the pressure value PB detected by the forward side pressure sensor 41B corresponds to HST charge relief pressure by the charge relief valve 38. Furthermore, when the vehicle body moves in the reverse direction, the pressure value PA detected by the forward side pressure sensor 41A corresponds to the HST charge relief pressure by the charge relief valve 38.

The number of rotation N of the engine 4 is adjusted by the step-on amount ST of the accelerator pedal 122 provided in the operator's cab 12. Specifically, as illustrated in FIG. 4, the step-on amount ST of the accelerator pedal 122 is proportional to the target engine rotational speed N, and accordingly, as the step-on amount ST increases, the target engine rotational speed N also increases. In this connection, since the rotational speed of the engine 4 corresponds to the number of rotation per time, the rotational speed of the engine 4 may be considered synonymous with the number of rotation of the engine 4.

A range where the step-on amount ST of the accelerator pedal 122 is 0 to ST1 (for example, the range of 0% to 20% or 30%) is set as a dead band in which the target engine rotational speed N is constant at predetermined minimum engine rotational speed Nmin regardless of the step-on amount of the accelerator pedal 122. Furthermore, a range where the step-on amount ST of the accelerator pedal 122 is ST2 to STmax (for example, the range of 70% or 80% to 100%) is set so that the target engine rotational speed N is maintained at the maximum target engine rotational speed Nmax regardless of the step-on amount ST of the accelerator pedal 122. These ranges can be arbitrarily set and changed.

The discharge flow rate of the HST charge pump 31A connected to the engine 4 is proportional to the rotational speed N of the engine 4. When the solenoid proportional pressure reducing valve 36 is not controlled based on the control signal output from the controller 5 as described later, relationship between the engine 4 and the HST pump 31 becomes the one as illustrated in FIG. 5(a) to FIG. 5(c).

As illustrated in FIG. 5(a), the rotational speed N of the engine 4 is proportional to the displacement volume q of the HST pump 31. As the rotational speed N of the engine 4 increases from N10 to N20, the displacement volume q increases from 0 to qmax. While the engine rotational speed N is equal to or greater than N20, the displacement volume q of the HST pump 31 is constant at the maximum value qmax regardless of the engine rotational speed N.

The input torque Thst of the HST pump 31 is expressed by the product of the traveling load pressure P and the displacement volume q of the HST pump 31 (Thst=P×q). As illustrated in FIG. 5(b), in a period between when the engine rotational speed N is N10 and when it is N20, the rotational speed N of the engine 4 is proportional to the input torque Thst of the HST pump 41, and as the rotational speed N of the engine 4 increases from N10 to N20, the input torque of the HST pump 41 increases. While the engine rotational speed N is N20 or more, the input torque Thst of the HST pump 31 is constant at the maximum value Tmax regardless of the engine rotational speed N.

As illustrated in FIG. 5(c), in a period between when the engine rotational speed N is N10 and when it is N20, the discharge flow rate Q of the HST pump 31 is proportional to the square of the engine rotational speed N. While the engine rotational speed N is N20 or more, the engine rotational speed N is linearly proportional to the discharge flow rate Q of the HST pump 31, and as the engine rotational speed N increases, the discharge flow rate Q increases. When the rotational speed N of the engine 4 increases, the discharge flow rate Q of the HST pump 31 increase. Then, when the flow rate of the hydraulic oil flowing from the HST pump 31 to the HST motor 33 increases, the rotational speed of the HST motor 33 increases, whereby the vehicle speed increases.

Figure 6:
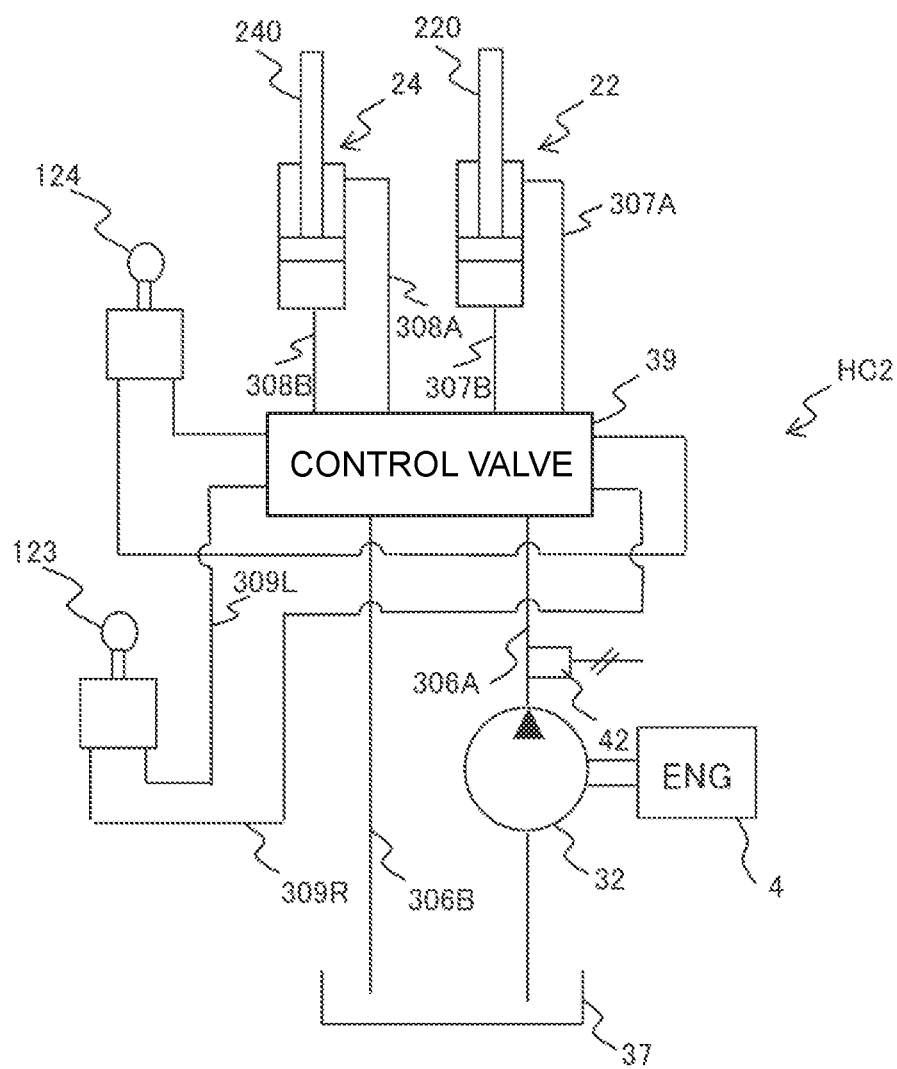
FIG. 6 illustrates a hydraulic circuit according to drive of a working device.

Next, a drive system of the working device 2 will be described with reference to FIG. 6. FIG. 6 illustrates a hydraulic circuit HC2 according to the drive of the working device 2.

The loading hydraulic circuit HC2 includes a fixed displacement type loading hydraulic pump 32, the lift arm cylinder 22, the bucket cylinder 24, and the control valve 39 configured to control a flow (direction and flow rate) of hydraulic oil discharged from the loading hydraulic pump 32 and flowing into the lift arm cylinder 22 and the bucket cylinder 24.

The control valve 39 is connected to the loading hydraulic pump 32 via a loading side discharge pipeline 306A, to the hydraulic oil tank 37 via a discharge pipeline 306B, to the lift arm cylinder 22 via a pair of lift arm side connection pipelines 307A, 307B, and to the bucket cylinder 24 via a pair of bucket side connection pipelines 308A, 308B, respectively.

Each of the lift arm cylinder 22 and the bucket cylinder 24 is driven in accordance with, respectively, an operation of a lift arm operation lever 123 and an operation of a bucket operation lever 124, which are provided in the operator's cab 12 (see FIG. 1).

For example, when the operator operates the lift arm operation lever 123, pilot pressure which is proportional to an operation amount thereof is generated as an operation signal. The generated pilot pressure is led to a pair of pilot pipelines 309L, 309R and acts on the left and right pressure receiving chambers of the control valve 39. As a result, the spool in the control valve 39 strokes in accordance with the pilot pressure, which determines the flow direction and flow rate of the hydraulic oil.

The hydraulic oil discharged from the loading hydraulic pump 32 is led to the loading side discharge pipeline 306A, and further led to one of the pair of lift arm side connection pipelines 307A, 307B via the control valve 39.

The lift arm side connection pipeline 307A, which is one of the pair of lift arm side connection pipelines 307A, 307B, is connected to a rod chamber of the lift arm cylinder 22, and the lift arm side connection pipeline 307B, which is the other one of the pair of lift arm side connection pipelines, is connected to a bottom chamber of the lift arm cylinder 22.

When the hydraulic oil discharged from the loading hydraulic pump 32 is led to the lift arm side connection pipeline 307B which is the other one of the pair of lift arm side connection pipelines, it flows into the bottom chamber of the lift arm cylinder 22, whereby the rod 220 of the lift arm cylinder 22 expands and the lift arm 21 is raised. At this time, the hydraulic oil flowing out from the rod chamber of the lift arm cylinder 22 is led to the lift arm side connection pipeline 307A which is one of the pair of lift arm side connection pipelines, further led to the discharge pipeline 306B via the control valve 39, and discharged to the hydraulic oil tank 37.

On the other hand, when the hydraulic oil discharged from the loading hydraulic pump 32 is led to the lift arm side connection pipeline 307A which is one of the pair of lift arm side connection pipelines, it flows into the rod chamber of the lift arm cylinder 22, whereby the rod 220 of the lift arm cylinder 22 contracts and the lift arm 21 is lowered. At this time, the hydraulic oil flowing out from the bottom chamber of the lift arm cylinder 22 is led to the lift arm side connection pipe 307B which is the other one of the pair of lift arm side connection pipelines, further guided to the discharge pipeline 306B via the control valve 39, and discharged to the hydraulic oil tank 37.

Since the bucket cylinder 24 is driven in the same manner as the lift arm cylinder 22, detailed description thereof is be omitted.

The loading side discharge pipeline 306A connected to the discharge side of the loading hydraulic pump 32 is provided with a discharge pressure sensor 42 configured to detect discharge pressure of the loading hydraulic pump 32. The discharge pressure detected by the discharge pressure sensor 42 is input to the controller 5 and used to determine an operation state of the working device 2.

(Functional Configuration of Controller 5)

Next, the functional configuration of the controller 5 will be described with reference to FIGS. 7 to 10.

Figure 7:
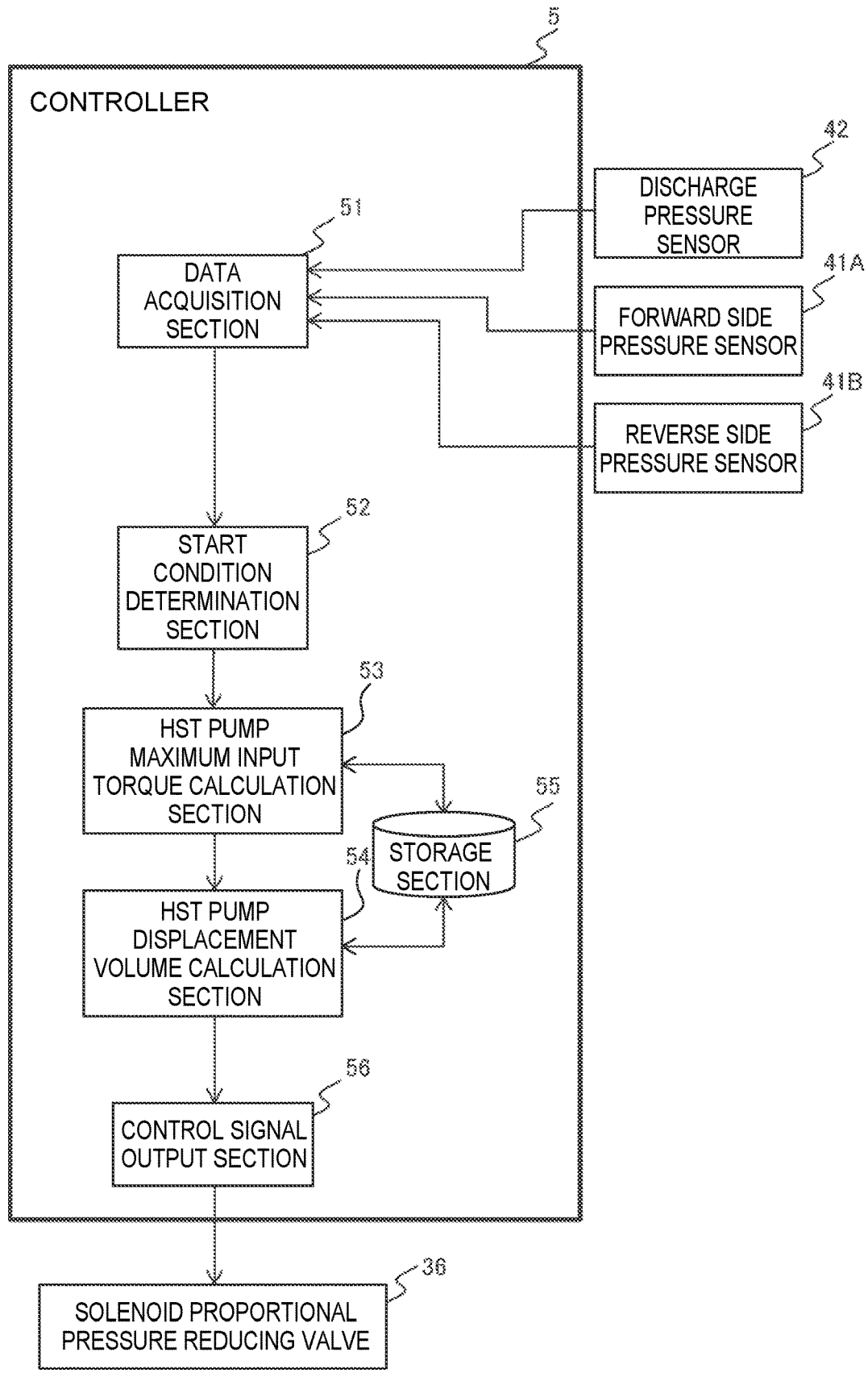
FIG. 7 is a functional block diagram illustrating functions of a controller.
Figure 8A:
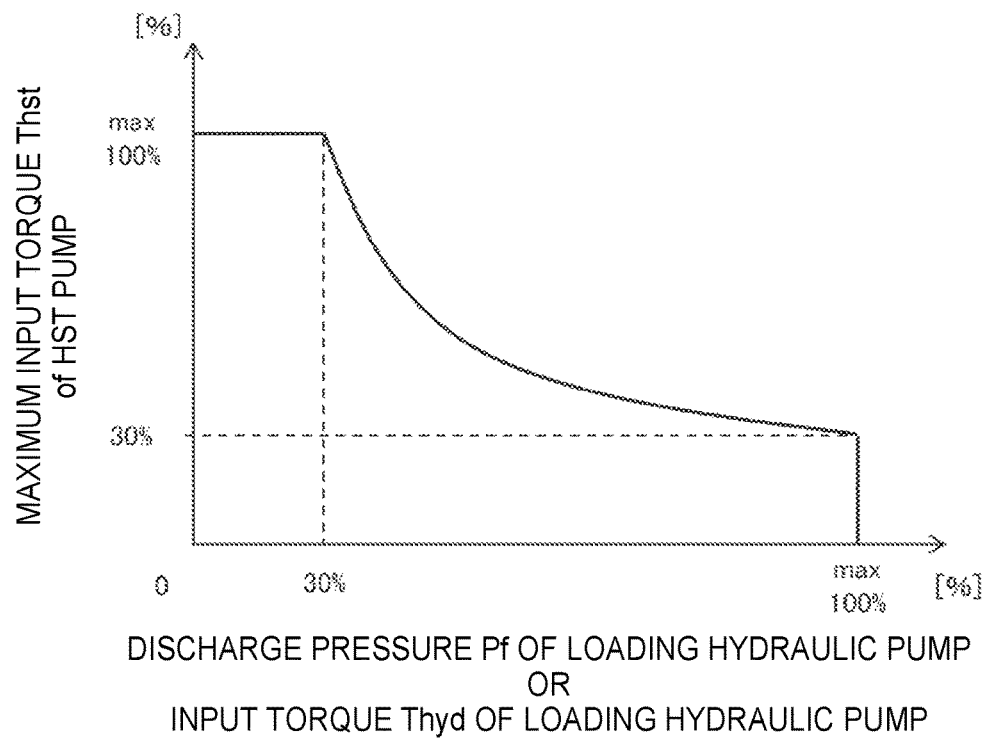
FIG. 8(a) illustrates a case of control in inverse proportion.
Figure 8B:
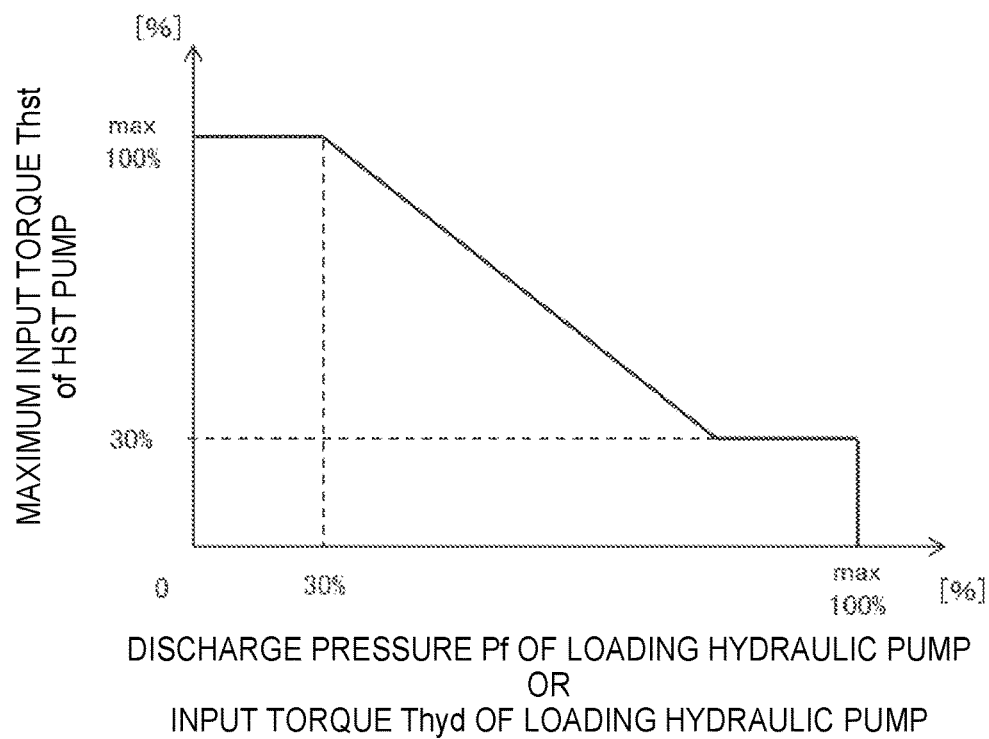
FIG. 8(b) illustrates a case of control in proportion.
Figure 9:
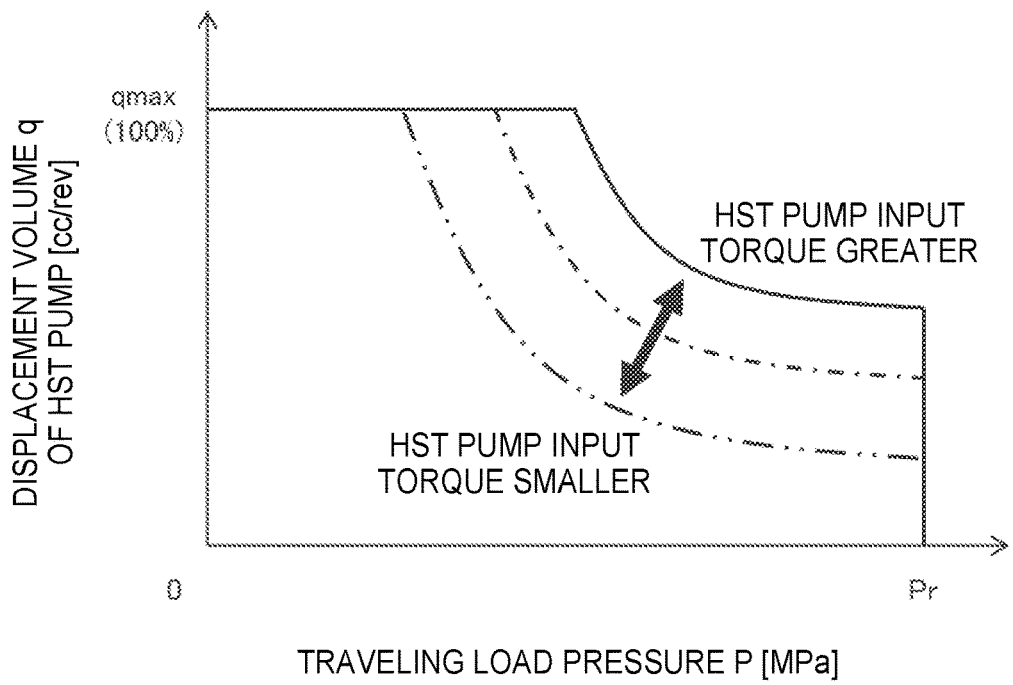
FIG. 9 illustrates a graph showing relationship between traveling load pressure and displacement volume of an HST pump.
Figure 10:
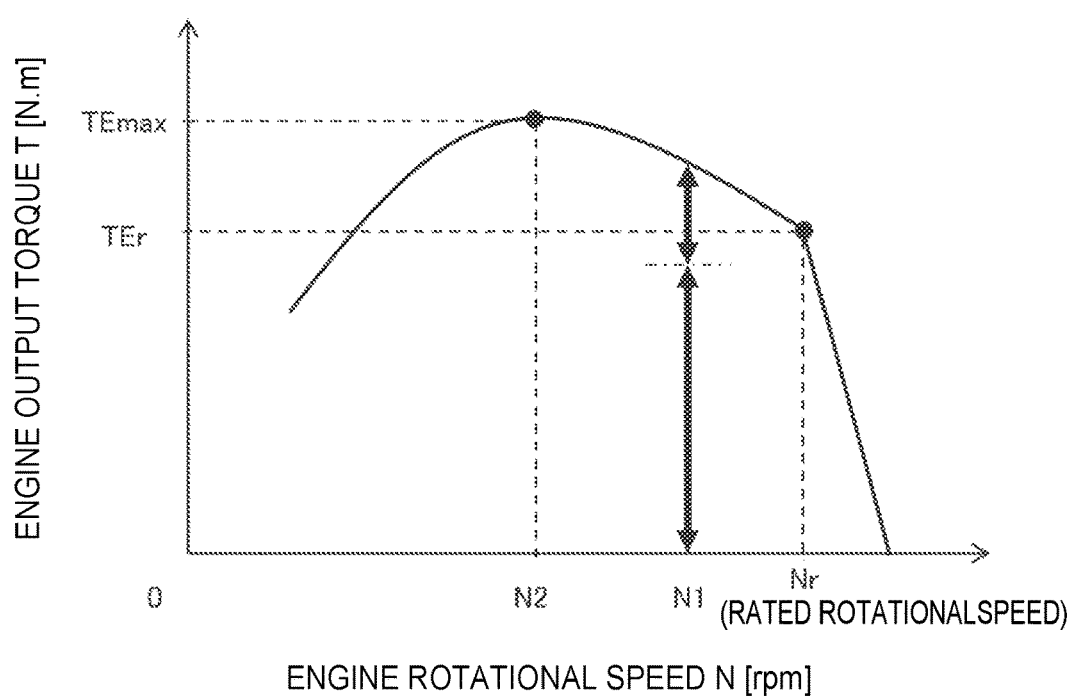
FIG. 10 explains relationship between output torque of an engine with respect to engine rotational speed, input torque of an HST pump, and input torque of loading hydraulic pump.

FIG. 7 is a functional block diagram illustrating functions of the controller 5. Each of FIG. 8(a) and FIG. 8(b) illustrates a graph showing relationship between discharge pressure Pf of the loading hydraulic pump 32 or input torque Thyd of the loading hydraulic pump 32 and maximum input torque Thst of the HST pump 31. In particular, FIG. 8(a) illustrates a case of control in inverse proportion, and FIG. 8(b) illustrates a case of control in proportion. FIG. 9 illustrates a graph showing relationship between the traveling load pressure P and the displacement volume q of the HST pump 31. FIG. 10 explains relationship between the output torque of the engine 4 relative to the rotational speed N of the engine 4, the input torque Thst of the HST pump 31, and the input torque Thyd of the loading hydraulic pump 32.

The controller 5 includes a CPU, a RAM, a ROM, an HDD, an input I/F, and an output I/F which are connected to each other via a bus. Various sensors such as the forward side pressure sensor 41A, the forward side pressure sensor 41B, and the discharge pressure sensor 42 and various operation devices are connected to the input I/F. The solenoid proportional pressure reducing valve 36, etc. is connected to the output I/F.

In this hardware configuration, the CPU reads out an arithmetic program (software) stored in a recording medium such as the ROM, the HDD, or an optical disk, expands it on the RAM, and executes the expanded arithmetic program. Accordingly, the arithmetic program and the hardware are operated in cooperation, thereby realizing the functions of the controller 5.

In the present embodiment, the controller 5 is described by a combination of software and hardware. Meanwhile, the present invention is not limited thereto, but an integrated circuit that realizes the functions of an arithmetic program executed on the side of the wheel loader 1 may be used.

As illustrated in FIG. 3, the controller 5 includes a data acquisition section 51, a start condition determination section 52, an HST pump maximum input torque calculation section 53, an HST pump displacement volume calculation section 54, a storage section 55, and a control signal output section 56.

The data acquisition section 51 is configured to acquire data relating to a forward side pressure value PA detected by the forward side pressure sensor 41A, a forward side pressure value PB detected by the forward side pressure sensor 41B, and discharge pressure Pf of the loading hydraulic pump 32 detected by the discharge pressure sensor 42. In the present embodiment, it is assumed that the traveling load pressure P while the vehicle body is moving in the forward direction corresponds to the forward side pressure value PA detected by the forward side pressure sensor 41A, and the traveling load pressure P while the vehicle body is moving in the reverse direction corresponds to the forward side pressure value PB detected by the forward side pressure sensor 41B.

The start condition determination section 52 determines whether a lifting operation of the working device 2 (lift arm 21) has been started based on the discharge pressure Pf of the loading hydraulic pump acquired by the data acquisition section 51.

When the start condition determination section 52 determines that the lifting operation of the working device 2 has been started, the HST pump maximum input torque calculation section 53 calculates the maximum input torque Thst of the HST pump 31 from the characteristic illustrated in FIG. 8(a) or FIG. 8(b) based on the discharge pressure Pf of the loading hydraulic pump 32 acquired by the data acquisition section 51.

FIG. 8(a) illustrates the characteristic in which the maximum input torque Thst of the HST pump 31 decreases in inverse proportion to increase in the discharge pressure Pf of the loading hydraulic pump 32. FIG. 8(b) illustrates the characteristic in which the maximum input torque Thst of the HST pump 31 decreases in proportion to increase in the discharge pressure Pf of the loading hydraulic pump 32.

In FIG. 8(a) and FIG. 8(b), when the discharge pressure Pf of the loading hydraulic pump 32 is in a range from 0% to 30%, the maximum input torque Thst of the HST pump 31 is constant at the maximum value (100%). This is because, when the discharge pressure Pf of the loading hydraulic pump 32 is in the range of 0% to 30%, the working device 2 is in a state in which the lifting operation has not been started, and thus there is no need that the controller 5 starts control of the maximum input torque Thst of the HST pump 31. Accordingly, in the controller 5, as described above, the start condition determination section 52 is configured to determine whether the lifting operation of the working device 2 has been started, specifically, determine whether the discharge pressure Pf of the loading hydraulic pump 32 has reached 30% (start condition).

In the present embodiment, as illustrated in FIG. 10, the HST pump maximum input torque calculation section 53 calculates the maximum input torque Thst of the HST pump 31 such that the sum of the maximum input torque Thst of the HST pump 31 and the maximum input torque Thyd of the loading hydraulic pump 32 is greater than rated output torque TEr of the engine 4 and smaller than the maximum output torque TEmax of the engine 4.

As a result, it is possible to maintain rotational speed N1 of the engine 4 between engine rotational speed N2 at the maximum output TEmax of the engine 4 and engine rotational speed Nr at the rated output torque TEr of the engine 4 (N2<N1<Nr).

The HST pump displacement volume calculation section 54 calculates, from the characteristic illustrated in FIG. 9 based on the traveling load pressure P (forward side pressure value PA or forward side pressure value PB) acquired by the data acquisition section 51, the displacement volume q of the HST pump 31 so as to obtain the maximum input torque Thst of the HST pump 31 as calculated by the HST pump maximum input torque calculation section 53.

The characteristic illustrated in FIG. 9 shows that, as the traveling load pressure P increases, the displacement volume q of the HST pump 31 decreases in inverse proportion, and moreover, is shifted depending on the magnitude of the maximum input torque Thst of the HST pump 31 which is based on the characteristics illustrated in FIG. 8(a) or FIG. 8(b). In other words, the controller 5 controls the displacement volume q of the HST pump 31 relative to the traveling load pressure P so that the area surrounded by the characteristic lines indicating the relationship between the traveling load pressure P and the displacement volume q of the HST pump 31, i.e., the maximum input torque Thst of the HST pump 31 is changed. In FIG. 9, the characteristic indicating the relationship between the traveling load pressure P and the displacement volume q of the HST pump 31 is shifted from the smaller to the greater of the maximum input torque Thst of the HST pump 31 in the order of a two-dot chain line, a one-dot chain line, and a solid line.

The storage section 55 stores the characteristics indicating the relationship between the discharge pressure Pf of the loading hydraulic pump 32 and the maximum input torque Thst of the HST pump 31 illustrated in FIGS. 8(a) and 8(b), and the characteristic indicating the relationship between the traveling load pressure P and the displacement volume q of the HST pump 31 illustrated in FIG. 9, respectively. Each of the two characteristics illustrated in FIG. 8(a) and FIG. 8(b) can be selectively used in accordance with the preference of the operator, etc.

In the present embodiment, the maximum input torque Thst of the HST pump 31 is controlled in accordance with the discharge pressure Pf of the loading hydraulic pump 32. Meanwhile, the discharge pressure Pf is not necessarily used for control, but the maximum input torque Thst of the HST pump 31 may be controlled in accordance with the input torque Thyd of the loading hydraulic pump 32.

The control signal output section 56 outputs, to the solenoid proportional pressure reducing valve 36, a control signal (control current) corresponding to the displacement volume q of the HST pump 31 calculated by the HST pump displacement volume calculation section 54.

(Processing in Controller 5)

Next, a specific flow of the processing executed by the controller 5 will be described with reference to FIG. 11.

Figure 11:
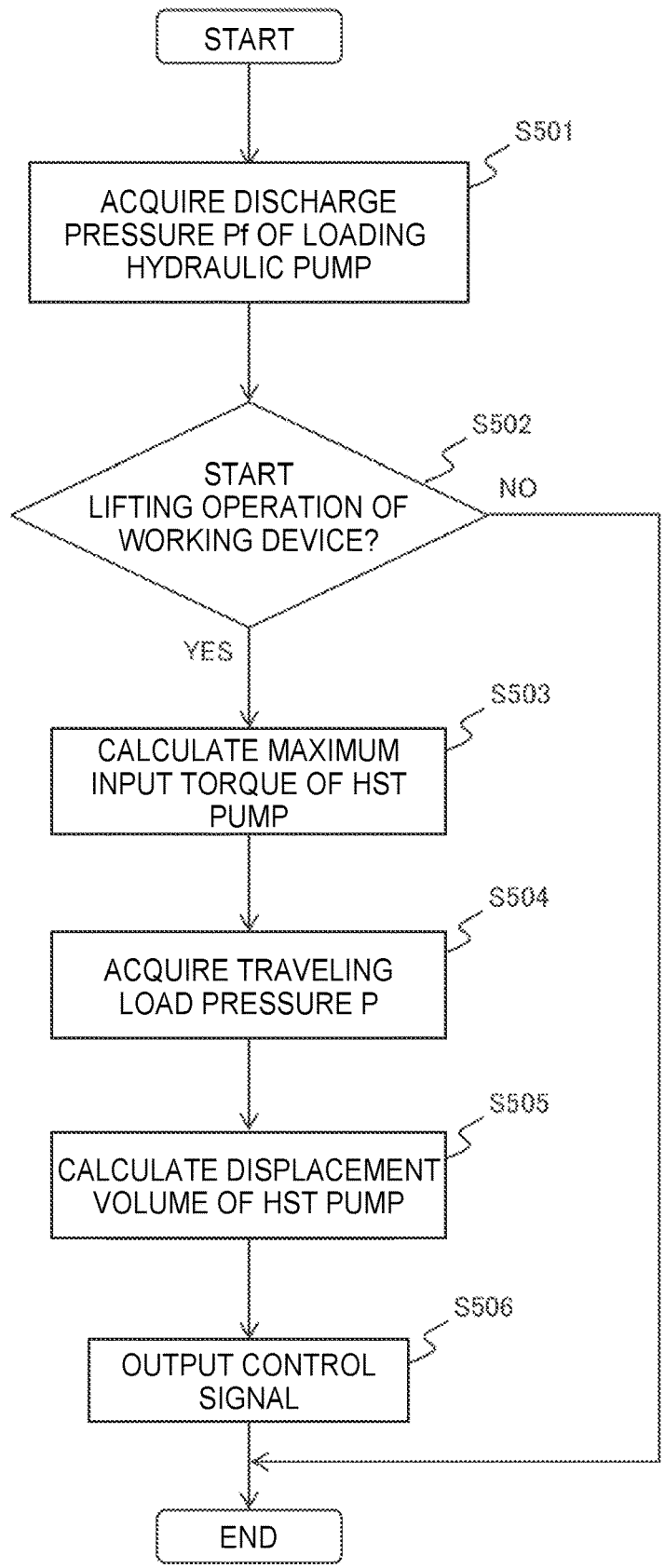
FIG. 11 illustrates a flowchart of a flow of processing executed by a controller.

FIG. 11 illustrates a flowchart of a flow of the processing executed by the controller 5.

First, the data acquisition section 51 acquires the discharge pressure Pf of the loading hydraulic pump 32 detected by the discharge pressure sensor 42 (step S501). Next, the start condition determination section 52 determines whether the lifting operation of the working device 2 has been started based on the discharge pressure Pf acquired in step S501 (step S502).

When the start condition determination section 52 determines that the lifting operation of the working device 2 is started in step S502 (step S502/YES), the data acquisition section 51 calculates the maximum input torque Thst of the HST pump 31 from the characteristic illustrated in FIG. 8(a) or FIG. 8(b) based on the discharge pressure Pf acquired in step S501 (step S503). When it is not determined that the lifting operation of the working device 2 has been started in step S502 (step S502/NO), the processing by the controller 5 is ended.

Next, the data acquisition section 51 acquires a pressure value detected by the forward side pressure sensor 41A or the forward side pressure sensor 41B, that is, the traveling load pressure P (step S504).

Subsequently, the HST pump displacement volume calculation section 54 calculates the displacement volume q of the HST pump from the characteristic illustrated in FIG. 9 based on the traveling load pressure P acquired in step S504 (|PA-PB|) so as to obtain the maximum input torque Thst of the HST pump 31 as calculated in step S503 (step S505).

Then, the control signal output section 56 outputs a control signal corresponding to the displacement volume q of the HST pump 31 calculated in step S505 to the solenoid proportional pressure reducing valve 36 (step S506), whereby the processing by the controller 5 is ended.

As described above, the displacement volume q of the HST pump 31 is controlled to perform adjustment so that the maximum input torque Thst of the HST pump 31 decreases as the discharge pressure Pf of the loading hydraulic pump 32 (input torque Thyd of the loading hydraulic pump 32) increases, and accordingly, the maximum input torque Thst of the HST pump 31 is prevented from becoming too large relative to the maximum input torque Thyd of the loading hydraulic pump 32.

For example, during dump approach in which the wheel loader 1 travels in the forward direction toward a dump truck while raising the lift arm 21 with a load loaded in the bucket 23, the maximum input torque Thyd of the loading hydraulic pump 32 is about 90% of the rated output torque TEr of the engine 4. At this time, when the maximum input torque Thst of the HST pump 31 is also set to be 90% of the rated output torque TEr of the engine 4, lifting speed of the working device 2 is largely slowed down, and furthermore, there is a possibility that it exceeds the maximum output torque TEmax and the engine 4 may stall.

Accordingly, as described above, the controller 5 is configured to limit the maximum input torque Thst of the HST pump 31 to be about 30% of the rated output torque TEr of the engine 4 in accordance with a state of the lifting operation of the working device 2. As a result, both the HST pump 31 and the loading hydraulic pump 32 can be efficiently driven, and therefore, it is possible to improve the balance between the vehicle speed and the lifting speed of the working device 2.

Furthermore, since the rotational speed N1 of the engine 4 in this case becomes the rotational speed in a range which is greater than the rotational speed N2 at the maximum output torque TEmax of the engine 4 and smaller than the rotational speed Nr at the rated output torque TEr, it is possible to efficiently perform the dump approach while preventing the rotational speed of the engine 4 from being lowered too much (see FIG. 10). Therefore, it is possible to realize the wheel loader 1 capable of improving the work efficiency by adjusting the rotational speed N of the engine 4 with high accuracy in accordance with an operation state of the working device 2.

In the above, the embodiment of the present invention has been described. It should be noted that the present invention is not limited to the embodiment and modifications described above, and various other modifications are included. For example, the embodiments described above have been explained in detail in order to clarify the present invention, but are not necessarily limited to those having all the configurations described. In addition, a part of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

For example, in the embodiment above, the solenoid proportional pressure reducing valve 36 is used as a solenoid proportional valve configured to generate the control pressure for controlling the displacement volume of the HST pump 31. Meanwhile, a pressure reducing valve is not necessarily used therefor.

Furthermore, for example, in the embodiment above, the HST motor 33 is electrically controlled one in the same manner as the HST pump 31. Meanwhile, it is not necessarily the electrically controlled motor, but it may be a hydraulic motor.

Still further, for example, in the embodiment above, the storage section 55 stores the characteristic illustrated in FIG. 8(a) and the characteristic illustrated in FIG. 8(b). Meanwhile, the storage section 55 does not necessarily store both of the characteristics, but may store at least a characteristic in which the maximum input torque Thst of the HST pump decreases as the discharge pressure Pf of the loading hydraulic pump 32 or the input torque of the loading hydraulic pump 32 increases.

REFERENCE SIGNS LIST

1: wheel loader (loading vehicle)
2: working device
4: engine
5: controller
11A: front wheel (wheel)
11B: rear wheel (wheel)
31: HST pump (traveling hydraulic pump)
32: loading hydraulic pump
33: HST motor (traveling hydraulic motor)
36: solenoid proportional pressure reducing valve (solenoid proportional valve)
42: discharge pressure sensor

The invention claimed is:

1. A loading vehicle comprising:
a vehicle body including a plurality of wheels;
an engine mounted on the vehicle body;
a variable displacement traveling hydraulic pump that is driven by the engine;
a traveling hydraulic motor that is connected to the traveling hydraulic pump through a closed circuit and transmits drive force of the engine to the plurality of wheels;
a working device that is mounted rotatably in a vertical direction with respect to the vehicle body;
a loading hydraulic pump that is driven by the engine and supplies hydraulic oil to the working device; and a discharge pressure sensor that detects discharge pressure of the loading hydraulic pump,
wherein the loading vehicle further comprises:
a controller configured to control input torque of the traveling hydraulic pump; and
a solenoid proportional valve configured to generate control pressure for controlling displacement volume of the traveling hydraulic pump based on a control signal output from the controller, and wherein the controller is configured to:
calculate the displacement volume of the traveling hydraulic pump based on the discharge pressure of the loading hydraulic pump detected by the discharge pressure sensor so that maximum input torque of the traveling hydraulic pump decreases as the discharge pressure of the loading hydraulic pump or the input torque of the loading hydraulic pump increases; and
output a control signal corresponding to the calculated displacement volume to the solenoid proportional valve.

2. The loading vehicle according to claim 1, wherein the controller is further configured to calculate the maximum input torque of the traveling hydraulic pump which decreases in inverse proportion to the discharge pressure of the loading hydraulic pump or the input torque of the loading hydraulic pump.

3. The loading vehicle according to claim 1, wherein the controller is further configured to calculate the maximum input torque of the traveling hydraulic pump which decreases in proportion to the discharge pressure of the loading hydraulic pump or the input torque of the loading hydraulic pump.

4. The loading vehicle according to claim 1, wherein the controller is further configured to calculate the maximum input torque of the traveling hydraulic pump so that a sum of the maximum input torque of the traveling hydraulic pump and the maximum input torque of the loading hydraulic pump becomes greater than a rated output torque of the engine and smaller than maximum output torque of the engine.

* * * * *